US012065779B2

(12) United States Patent
Motohashi et al.

(10) Patent No.: US 12,065,779 B2
(45) Date of Patent: Aug. 20, 2024

(54) RAW-MATERIAL FEEDING DEVICE

(71) Applicant: SEIKO EPSON CORPORATION, Tokyo (JP)

(72) Inventors: Koji Motohashi, Nagano (JP); Makoto Sato, Nagano (JP); Takashi Abe, Yamagata (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 17/386,601

(22) Filed: Jul. 28, 2021

(65) Prior Publication Data

US 2022/0034029 A1 Feb. 3, 2022

(30) Foreign Application Priority Data

Jul. 30, 2020 (JP) ................................ 2020-129644

(51) Int. Cl.
*D21B 1/08* (2006.01)
*B27N 3/04* (2006.01)
(Continued)

(52) U.S. Cl.
CPC ................ *D21B 1/08* (2013.01); *B27N 3/04* (2013.01); *D21B 1/063* (2013.01); *D21F 9/00* (2013.01)

(58) Field of Classification Search
CPC .. D21B 1/08; D21B 1/063; D21F 9/00; B27N 3/04
See application file for complete search history.

(56) References Cited

U.S. PATENT DOCUMENTS 3,785,577 A * 1/1974 Carlsmith ................ D21C 9/10 162/236
5,950,934 A * 9/1999 Podesta ................ E01C 19/203 239/650
(Continued)

FOREIGN PATENT DOCUMENTS

CN 108609404 A * 10/2018
JP 2011-241497 A 12/2011
JP 2020-203256 A 12/2020

*Primary Examiner* — Jacob T Minskey
*Assistant Examiner* — Stephen M Russell
(74) *Attorney, Agent, or Firm* — Global IP Counselors, LLP

(57) ABSTRACT

A raw-material feeding device includes: a storage section that includes a bottom section and a side wall standing from the bottom section and that stores, in a storage space surrounded by the bottom section and the side wall, small pieces of raw material constituted by a material containing fibers; a stirring section that is provided in the bottom section at a position facing the storage space, that includes a blade which rotates about a rotational axis extending in a direction in which the side wall stands, and that stirs the raw material in the storage space by rotating the blade; a first discharging section that is provided in the side wall so as to communicate with the storage space, that includes a first tubular body rotating about a first axis intersecting the rotational axis, and that discharges, upon rotation of the first tubular body, the raw material in the storage space to a processing section; and a second discharging section that is provided in the side wall at a position different from a position at which the first tubular body is provided so as to communicate with the storage space, that includes a second tubular body rotating about a second axis intersecting the rotational axis, and that discharges, upon rotation the second tubular body, the raw material in the storage space to the processing section.

12 Claims, 13 Drawing Sheets

(51) Int. Cl.
*D21B 1/06* (2006.01)
*D21F 9/00* (2006.01)

(56) References Cited

U.S. PATENT DOCUMENTS

| | | | | |
|---|---|---|---|---|
| 2017/0142930 | A1* | 5/2017 | Huang | A01K 7/06 |
| 2017/0173541 | A1* | 6/2017 | Zuidema | B01F 35/187 |
| 2019/0127927 | A1* | 5/2019 | Nakonechny | C08L 95/00 |
| 2020/0398236 | A1 | 12/2020 | Motohashi et al. | |

* cited by examiner

RAW-MATERIAL FEEDING DEVICE

The present application is based on, and claims priority from JP Application Serial Number 2020-129644, filed Jul. 30, 2020, the disclosure of which is hereby incorporated by reference herein in its entirety.

BACKGROUND

1. Technical Field

The present disclosure relates to a raw-material feeding device.

2. Related Art

Sheet manufacturing apparatuses that produce recycled paper from used paper and include a storage section for storing coarsely crushed pieces of paper have been known. Such a storage section may include a stirring device that stirs paper pieces and feeds the paper pieces by a predetermined amount to stably send the stored paper pieces in an amount that is able to be processed by the subsequent processing section. As such a stirring device, a stirring device including, on a bottom surface, a stirring member that rotates to stir paper pieces stored therein and feed the paper pieces to the subsequent processing section has been known (for example, refer to JP-A-2011-241497).

The stirring device described in JP-A-2011-241497 includes a storage container in which a paper material is stirred, a scraping rod that is provided in the storage container and that rotates, and a discharge port that is provided at the bottom surface of the storage container. Rotating the scraping rod urges the paper material in the storage container to be discharged via the discharge port.

However, since the stirring device described in JP-A-2011-241497 has the discharge port provided at the bottom surface, when paper pieces aggregate, the aggregated paper pieces collectively drop and are discharged. Moreover, since only a single discharge port is provided in the stirring device, it is difficult to accurately control the discharge amount of the paper material. Accordingly, the stirring device described in JP-A-2011-241497 may cause a variation in the discharge amount.

SUMMARY

The disclosure is made to address the aforementioned problem and is able to be implemented as follows.

A raw-material feeding device of the disclosure includes: a storage section that includes a bottom section and a side wall standing from the bottom section and that stores, in a storage space surrounded by the bottom section and the side wall, small pieces of raw material constituted by a material containing fibers; a stirring section that is provided in the bottom section at a position facing the storage space, that includes a blade which rotates about a rotational axis extending in a direction in which the side wall stands, and that stirs the raw material in the storage space by rotating the blade; a first discharging section that is provided in the side wall so as to communicate with the storage space, that includes a first tubular body rotating about a first axis intersecting the rotational axis, and that, upon rotation of the first tubular body, discharges, via the first tubular body, the raw material in the storage space to a processing section that processes the raw material; and a second discharging section that is provided in the side wall at a position different from a position at which the first tubular body is provided so as to communicate with the storage space, that includes a second tubular body rotating about a second axis intersecting the rotational axis, and that, upon rotation of the second tubular body, discharges, via the second tubular body, the raw material in the storage space to the processing section.

DESCRIPTION OF EXEMPLARY EMBODIMENTS

Hereinafter, a raw-material feeding device of the disclosure will be described in detail with reference to embodiments illustrated in the accompanying drawings.

First Embodiment

Figure 1:
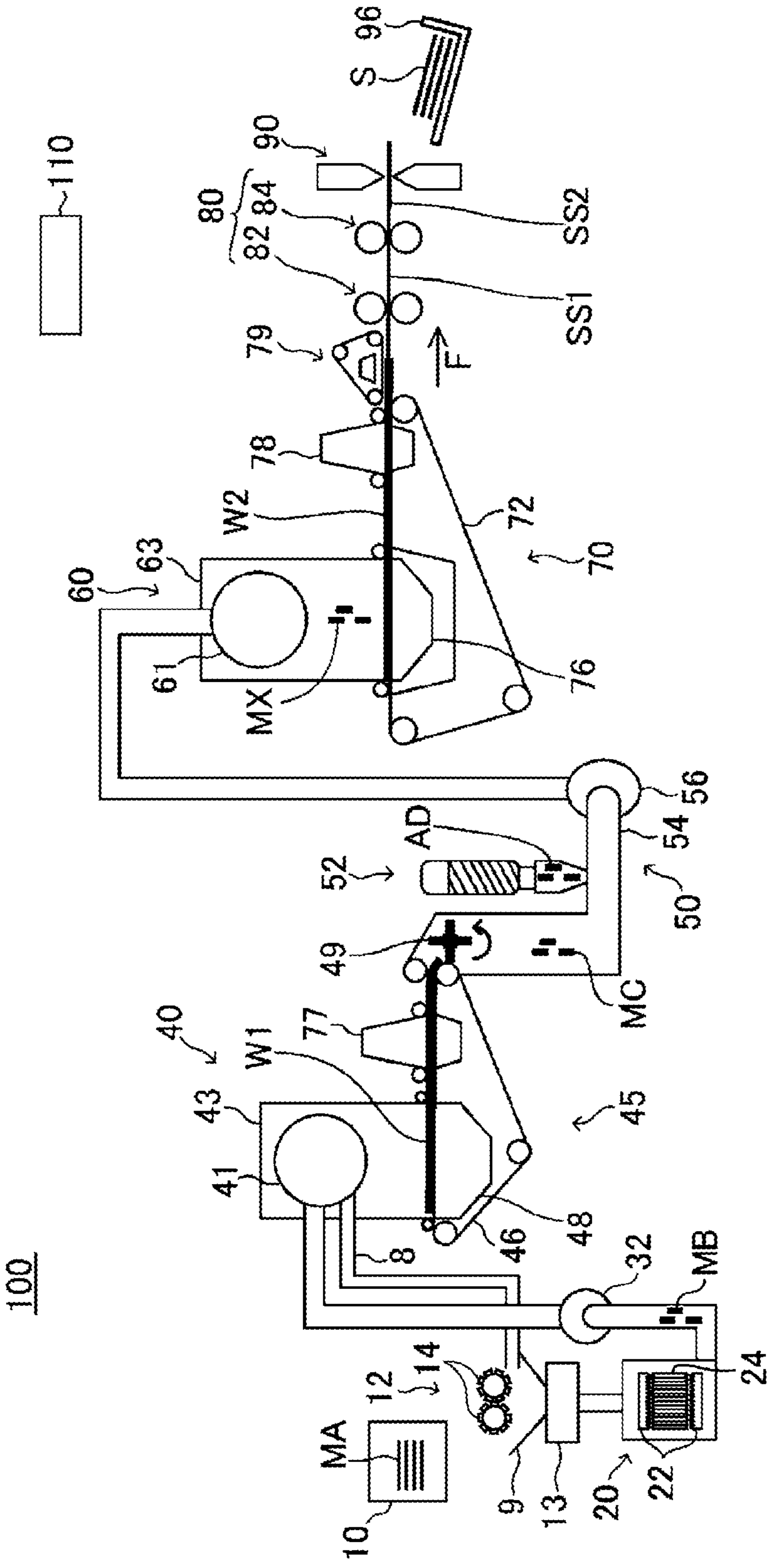
FIG. 1 is a schematic structural view of a sheet manufacturing apparatus including a raw-material feeding device according to a first embodiment of the disclosure.
Figure 2:
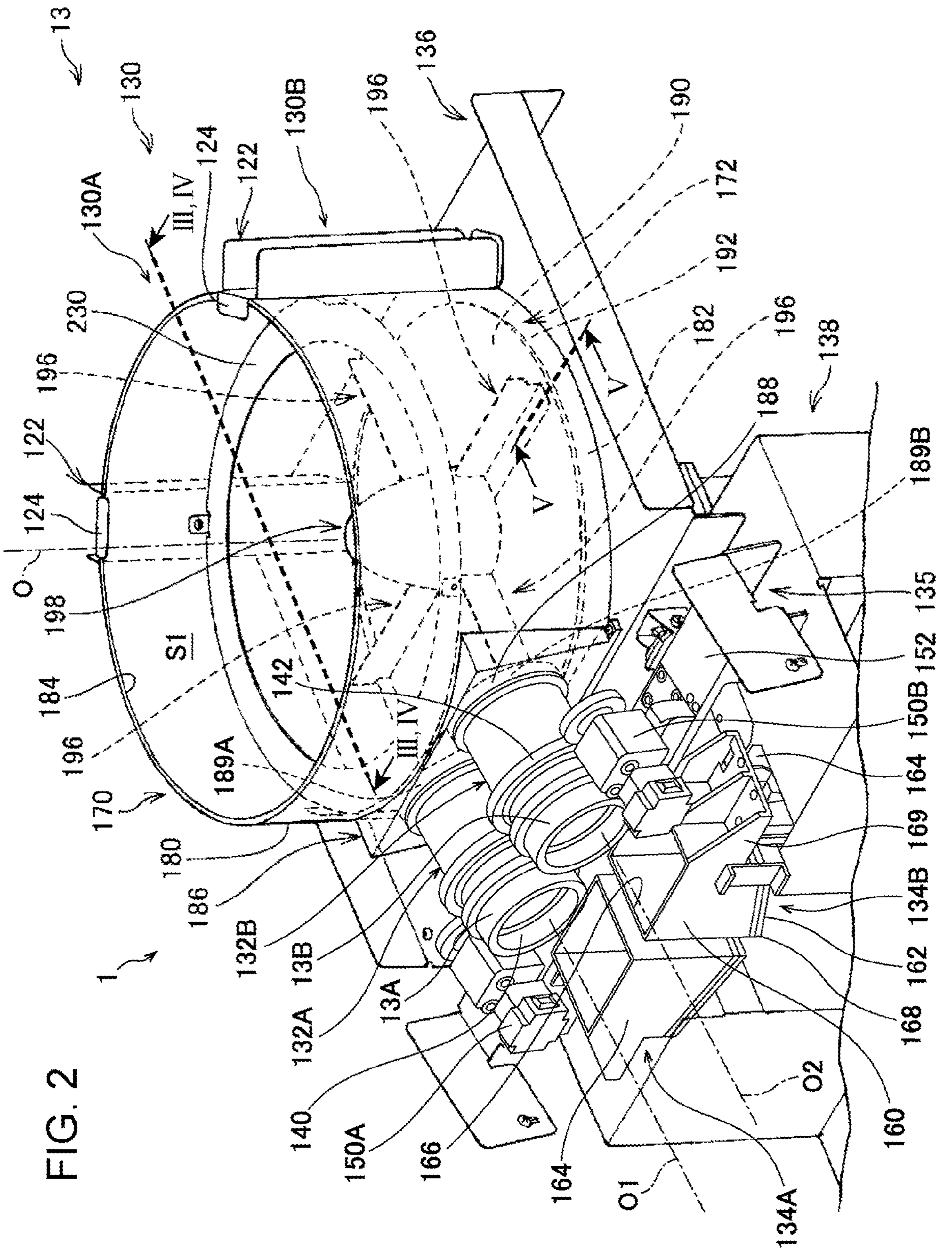
FIG. 2 is a perspective view of a storage section of the raw-material feeding device illustrated in FIG. 1.
Figure 3:
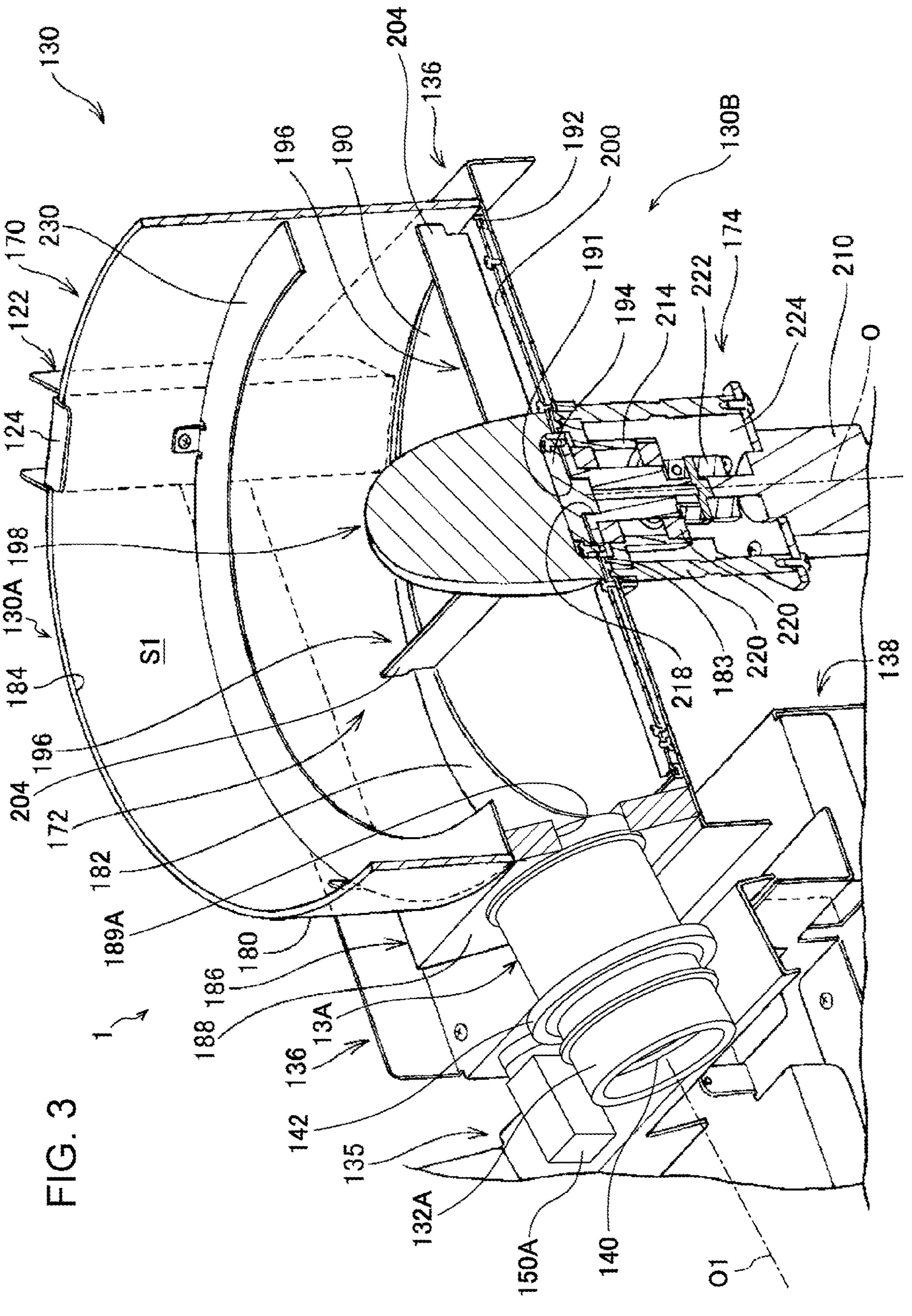
FIG. 3 is a longitudinal sectional perspective view along line III-III in FIG. 2.
Figure 4:
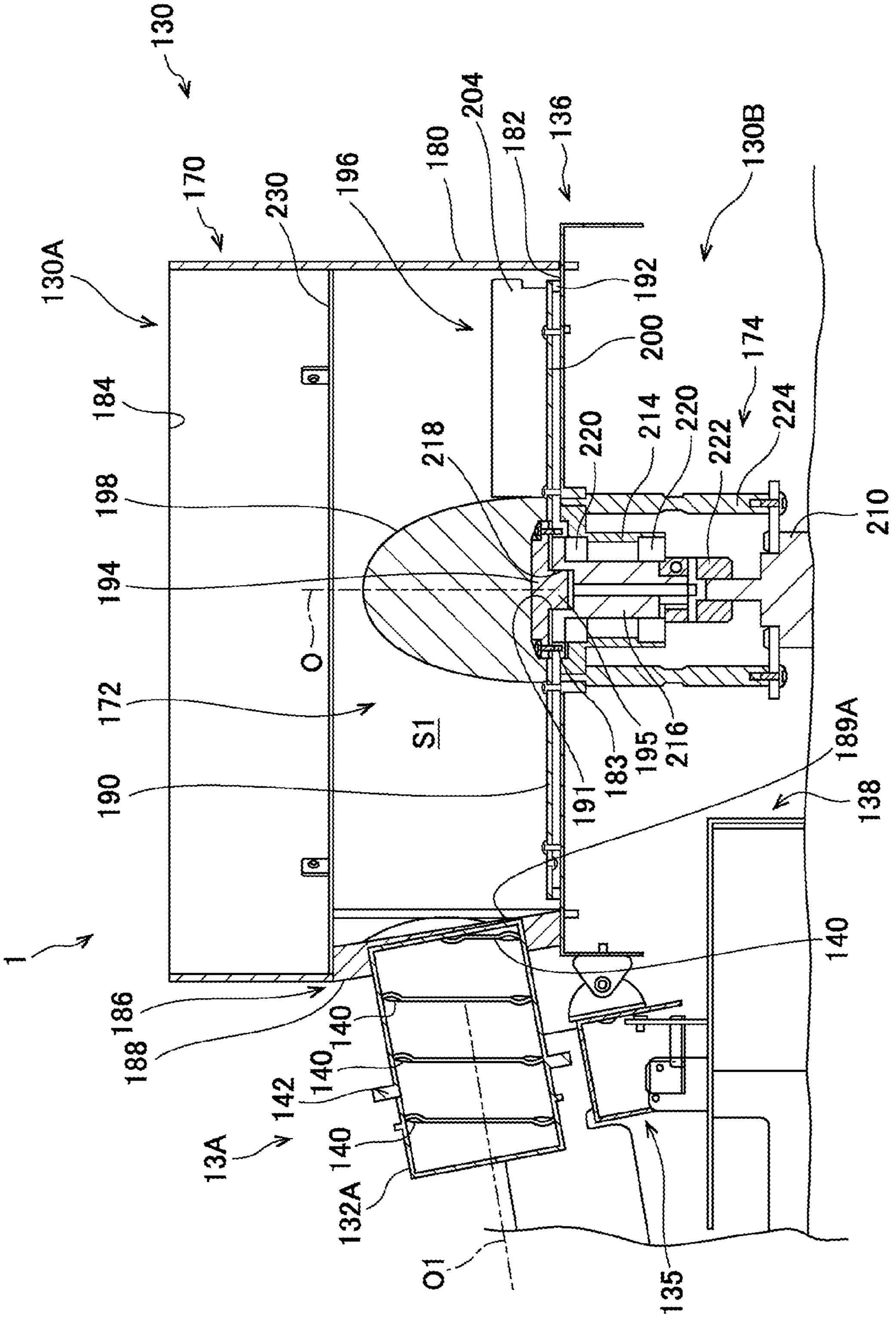
FIG. 4 is a longitudinal sectional view along line IV-IV in FIG. 2.
Figure 5:
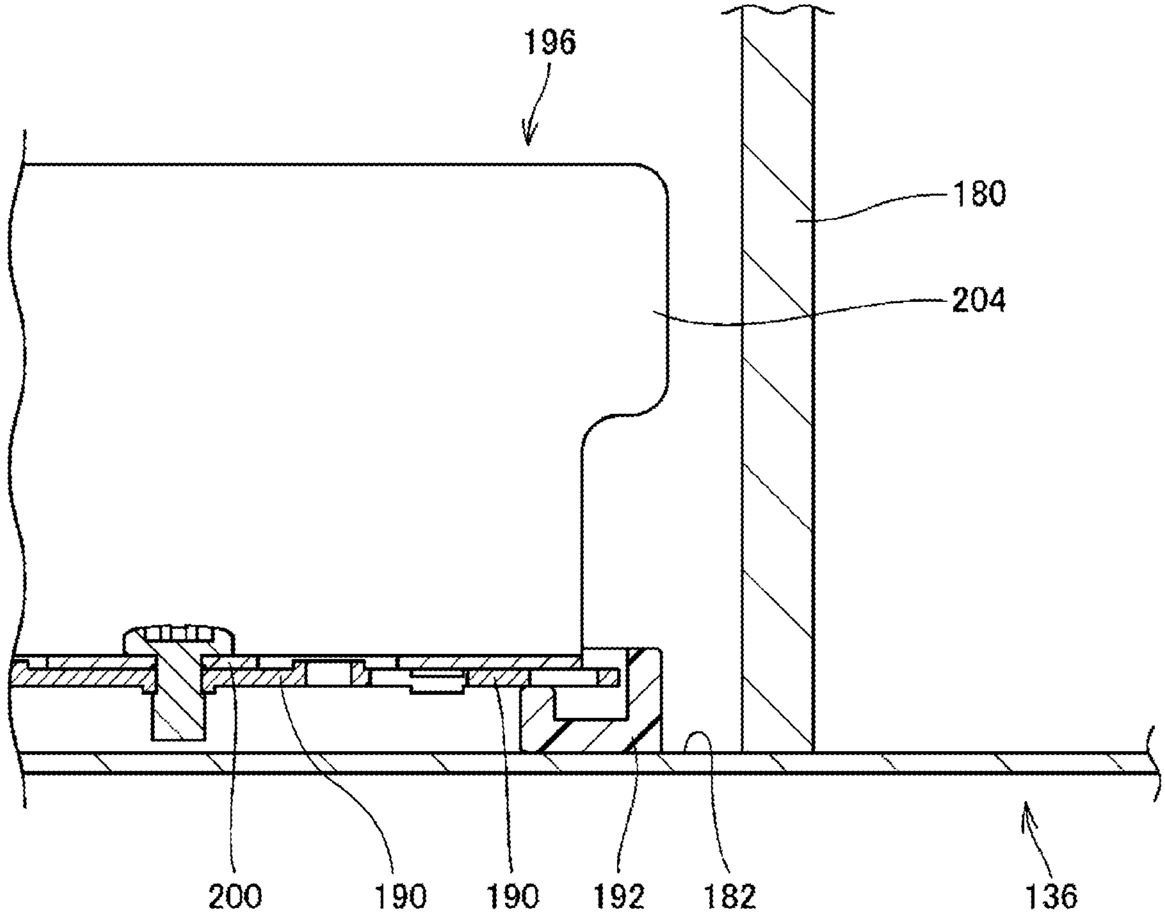
FIG. 5 is a longitudinal sectional view along line V-V in FIG. 2.
Figure 6:
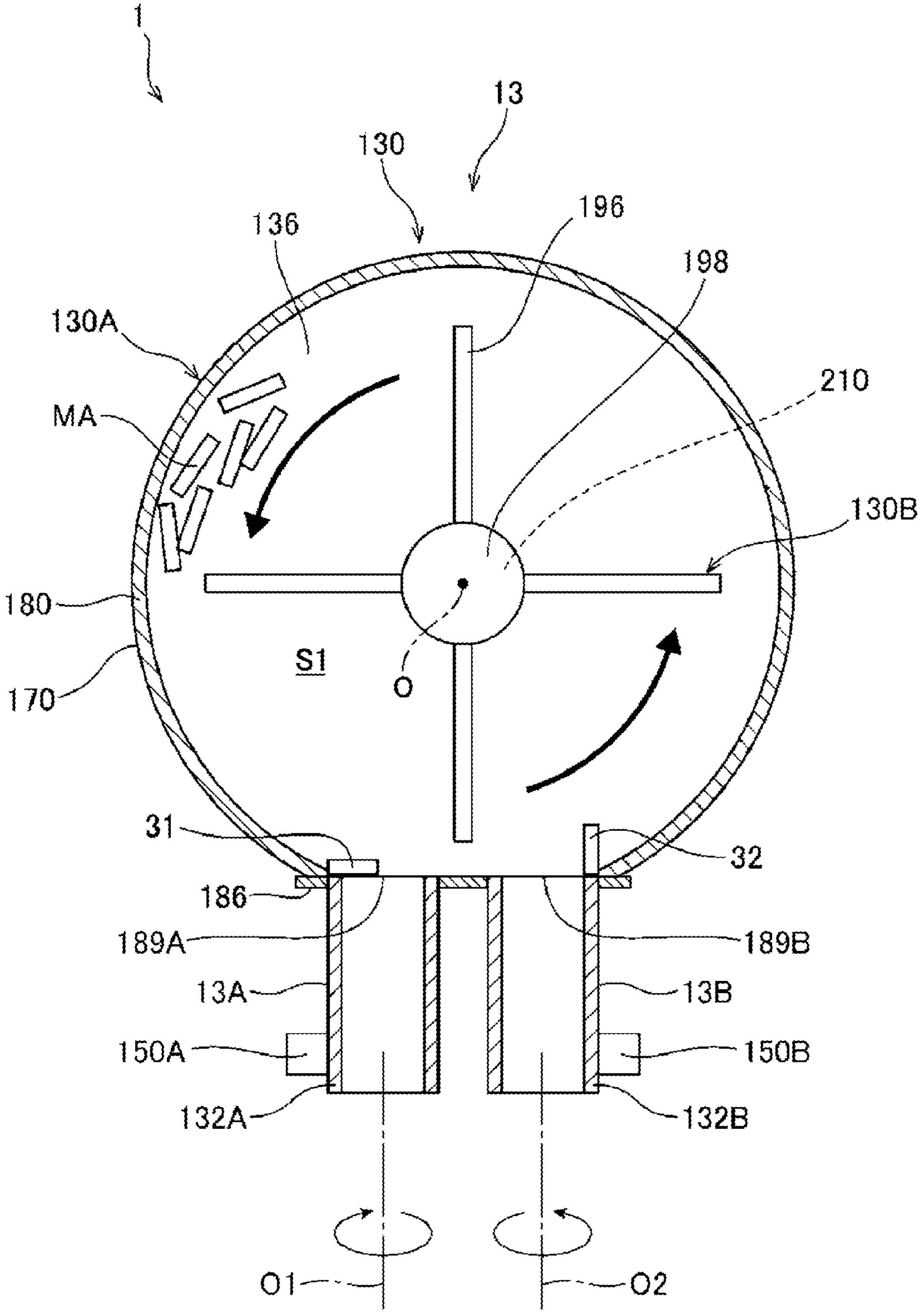
FIG. 6 is a transverse sectional view schematically illustrating the raw-material feeding device illustrated in FIG. 1.

FIG. 1 is a schematic structural view of a sheet manufacturing apparatus that includes a raw-material feeding device according to a first embodiment of the disclosure. FIG. 2 is a perspective view of a storage section of the raw-material feeding device illustrated in FIG. 1. FIG. 3 is a longitudinal sectional perspective view along line III-III in FIG. 2. FIG. 4 is a longitudinal sectional view along line IV-IV in FIG. 2. FIG. 5 is a longitudinal sectional view along line V-V in FIG. 2. FIG. 6 is a transverse sectional view schematically illustrating the raw-material feeding device illustrated in FIG. 1.

Note that, in the following description, for convenience of description, an upper side in FIGS. 1 to 6 is referred to as "above" or "upper", and a lower side in FIGS. 1 to 6 is referred to as "below" or "lower". A rotational direction of a blade 196, that is, a tip end side of an arrow, is referred to as "downstream", and a base end side of the arrow is referred to as "upstream".

As illustrated in FIG. 1, a sheet manufacturing apparatus 100 includes a feeding section 10, a coarse-crushing section 12, a quantitative-feeding device 13, a defibrating section 20, a sorting section 40, a first web-forming section 45, a rotator 49, a mixing section 50, a dispersing section 60, a second web-forming section 70, a web transporting section 79, a processing section 80, and a cutting section 90. The sheet manufacturing apparatus 100 fiberizes raw material MA that contains fibers, such as a wood pulp material, kraft pulp, used paper, and synthetic pulp, to form a sheet S1. Of the aforementioned components, the feeding section 10, the coarse-crushing section 12, and the quantitative-feeding device 13 constitute the raw-material feeding device 1 of the disclosure. Note that the feeding section 10 and the coarse-crushing section 12 are not required to be components of the raw-material feeding device 1.

The feeding section 10 feeds the raw material MA to the coarse-crushing section 12. The coarse-crushing section 12 is a shredder that cuts the raw material MA by using a coarse-crushing blade 14. The raw material MA is cut into small pieces by the coarse-crushing section 12, and the small pieces are collected by a hopper 9 and transported to the quantitative-feeding device 13.

The quantitative-feeding device 13 temporarily stores the raw material MA, which is formed of fiber pieces, fed from the coarse-crushing section 12 and quantitatively feeds a predetermined amount of the raw material MA to the defibrating section 20. This makes it possible to retain a predetermined amount of the raw material MA to be fed for a process of manufacturing the sheet S; in other words, it is possible to feed the raw material MA quantitatively.

The defibrating section 20 defibrates fine pieces cut by the coarse-crushing section 12 into a defibrated material MB by using a drying method. Defibration is a process of unraveling the raw material MA, which is in a state in which a plurality of fibers are bound together, into single fibers or small cluster of fibers. The dry method refers to performing processing such as defibration in a gas, such as in the air, instead of in a liquid. The defibrated material MB contains constituents derived from the raw material MA, such as fibers contained in the raw material MA, resin particles, coloring agents such as ink and toner, a bleeding inhibitor, and a paper strengthening agent.

The defibrating section 20 is, for example, a mill that includes a tubular stator 22 and a rotor 24 that rotates inside the stator 22. The defibrating section 20 defibrates coarsely crushed pieces with the crushed pieces held between the stator 22 and the rotor 24. The defibrated material MB is transported to the sorting section 40 through a pipe.

The sorting section 40 has a drum section 41 and a housing 43 that accommodates the drum section 41. The drum section 41 is a sieve having openings, such as a mesh, a filter, or a screen, and is rotated by a motor (not illustrated). The defibrated material MB is loosened inside the drum section 41, which is rotating, and is lowered through the openings of the drum section 41. Constituents of the defibrated material MB that do not pass through the openings of the drum section 41 are transported to the hopper 9 through a pipe 8.

The first web-forming section 45 includes a mesh belt 46 that is endless and that has a large number of openings. The first web-forming section 45 forms a first web W1 by accumulating, on the mesh belt 46, fibers or the like lowered from the drum section 41. Constituents lowered from the drum section 41 that are smaller than the openings of the mesh belt 46 are suctioned through the mesh belt 46 and removed by a suctioning section 48. As a result, of the constituents of the defibrated material MB, short fibers which are not suitable for forming the sheet S, resin particles, ink, toner, a bleeding inhibitor, and the like are removed.

A humidifier 77 is disposed in a movement path of the mesh belt 46, and the first web W1 that accumulates on the mesh belt 46 is humidified by a mist of water or high-humidity air. The first web W1 is transported by the mesh belt 46 and comes into contact with the rotator 49. The rotator 49 divides the first web W1 by using a plurality of blades to obtain a material MC. The material MC is transported to the mixing section 50 through a pipe 54.

The mixing section 50 includes an additive feeding section 52 that adds an additive material AD to the material MC and a mixing blower 56 that mixes the material MC and the additive material AD. The additive material AD contains a binding material, such as a resin, for binding a plurality of fibers. Note that the additive material AD may contain a colorant, an aggregation inhibitor, a flame retardant, and the like. The mixing blower 56 generates an airflow in the pipe 54 through which the material MC and the additive material AD are transported, mixes the material MC and the additive material AD, and transports a mixture MX to the dispersing section 60.

The dispersing section 60 includes a drum section 61 and a housing 63 that accommodates the drum section 61. The drum section 61 is a cylindrical sieve formed similarly to the drum section 41 and is driven by a motor (not illustrated) to rotate. Upon rotation of the drum section 61, the mixture MX is loosened and is lowered in the housing 63.

The second web-forming section 70 includes a mesh belt 72 that is endless and that has a large number of openings. The second web-forming section 70 forms a second web W2 by accumulating, on the mesh belt 72, the mixture MX lowered from the drum section 61. Constituents of the mixture MX smaller than the openings of the mesh belt 72 are suctioned through the mesh belt 72 by a suctioning section 76.

A humidifier 78 is disposed in a movement path of the mesh belt 72, and the second web W2 that accumulates on the mesh belt 72 is humidified by a mist of water or high-humidity air.

The second web W2 is peeled off from the mesh belt 72 by the web transporting section 79 and transported to the processing section 80. The processing section 80 includes a pressing section 82 and a heating section 84. The pressing section 82 holds the second web W2 between a pair of pressing rollers and presses the second web W2 with a predetermined nip pressure to form a pressed sheet SS1. The heating section 84 applies heat to the pressed sheet SS1 with the pressed sheet SS1 nipped by a pair of heating rollers. Thereby, fibers contained in the pressed sheet SS1 are bound to each other by resin contained in the additive material AD, and a heated sheet SS2 is formed. The heated sheet SS2 is transported to the cutting section 90.

The cutting section 90 cuts the heated sheet SS2 in a direction intersecting a transport direction F or in a direction extending in the transport direction F to form a sheet S of a predetermined size. The sheet S is stored in a stock section 96.

The sheet manufacturing apparatus 100 includes a control device 110. The control device 110 controls sections of the sheet manufacturing apparatus 100 including the defibrating section 20, the additive feeding section 52, the mixing blower 56, the dispersing section 60, the second web-forming section 70, the processing section 80, and the cutting section 90 and causes the sections to perform a method of manufacturing the sheet S. In addition, the control device 110 may control operation of the feeding section 10, the sorting section 40, the first web-forming section 45, and the rotator 49.

Next, the configuration of the quantitative-feeding device 13 will be described. Note that, in FIG. 2, some of support members 122 are illustrated, and the other support members 122 are omitted. The quantitative-feeding device 13 includes a stirring device 130, a first discharging section 13A, a second discharging section 13B, a measuring section 134A, and a measuring section 134B.

The stirring device 130 is provided on an upper surface of a mounting table 136, temporarily stores therein the raw material MA, which is formed of paper-like fiber pieces, transported from the hopper 9, and stirs the raw material MA. As illustrated in FIGS. 3 and 4, the stirring device 130 includes a case 170, a rotator 172, and a driving mechanism 174. Note that a stirring section 130B is constituted by the rotator 172 and the driving mechanism 174.

The case 170 is a cylindrical member that stores the raw material MA fed from the hopper 9, and the case 170 is formed by mounting a side wall 180 on the mounting table 136. That is, a space which has a bottom section formed of the mounting table 136 and which is surrounded by the mounting table 136 and the side wall 180 is a storage space S1 in which the raw material MA is stored. A storage section 130A is constituted by the mounting table 136 and the side wall 180. Note that the mounting table 136 and the side wall 180 may be integrally formed.

The side wall 180 is fixed to the mounting table 136 by being supported by a plurality of support members 122. As illustrated in FIG. 3, each of the support members 122 is formed of a plate member having three surfaces. The support members 122 are each disposed on the upper surface of the mounting table 136 and all extend vertically along the side wall 180. Note that, in FIG. 3, some of the support members 122 are illustrated, and the other support members 122 are omitted. Each of the support members 122 includes a claw section 124 in an upper end, and each of the claw sections 124 engages an upper end of the side wall 180, and the side wall 180 is thereby fixed to the mounting table 136.

An extended section 230 is provided across the whole inner surface of the side wall 180 in the circumferential direction. The extended section 230 is an annular plate member and is supported by the plurality of support members 122 provided along the outer surface of the side wall 180. The extended section 230 is fixed to each of the support members 122 via the side wall 180 by a screw member. That is, the side wall 180 is fixed, together with the extended section 230, to each of the support members 122 by the screw member. In the present embodiment, the extended section 230 is fixed so as to be located at a height substantially half the height of the side wall 180.

Since the extended section 230 is provided, when the raw material MA fed into the stirring device 130 is stirred, the raw material MA is inhibited from being flung upward and inhibited from overflowing from a feed port 184 due to the presence of the extended section 230. Note that the side wall 180 and the extended section 230 may be integrally formed. In addition, the height at which the extended section 230 is provided and the protruding dimension may be adjusted in accordance with the shape, size, and processing speed of the stirring device 130.

The upper surface of the mounting table 136 surrounded by the side wall 180 forms a bottom surface 182 of the case 170. A bottom-surface hole 183 serving as a through hole is provided at a position corresponding to the center of a rotating section 190 described later when the bottom surface 182 is viewed from above. Note that the bottom surface 182 of the case 170 may be constituted by a member provided separately from the upper surface of the mounting table 136.

The feed port 184 is provided in an upper end of the case 170. The hopper 9 is disposed above the case 170, that is, in a direction away from the bottom surface 182 of the case, and the raw material MA is able to be fed from the hopper 9 into the case 170 via the feed port 184.

A discharging member 186 is provided in the side wall 180 of the case 170. The discharging member 186 is a box-shaped member provided so as to protrude outward from below the side wall 180 facing the measuring section 134 and has a hollow interior. The discharging member 186 is provided with an inclined surface 188 at a position facing the measuring section 134. The inclined surface 188 is provided so as to be inclined upward in a direction toward the measuring section 134. The inclined surface 188 is provided with a communication port 189A and a communication port 189B that enable communication between the inside and the outside of the case 170. The raw material MA stored inside the case 170 is discharged from the communication port 189A and the communication port 189B.

A discharging pipe 132A, which is a first tubular body described later, is coupled to the communication port 189A, and a discharging pipe 132B, which is a second tubular body described later, is coupled to the communication port 189B.

The rotator 172 is a member provided to be rotatable with respect to the bottom surface 182 and stirs the raw material MA fed into the case 170. The rotator 172 includes the rotating section 190, a sealing member 192, a plurality of blades 196, and a protruding member 198.

The rotating section 190 is a disk-shaped member having a diameter smaller than that of the bottom surface 182 and is disposed parallel to the bottom surface 182 at a predetermined distance from the side wall 180 such that the peripheral edge thereof does not come into contact with the side wall 180. The rotating section 190 forms a portion of the bottom surface 182 in top view.

The center of the rotating section 190 in top view is located at a position different from the center of the bottom surface 182 in top view. Specifically, the center of the rotating section 190 in top view is located at a position farther than the center of the bottom surface 182 in top view from the discharging member 186 in the radial direction of the rotating section 190. A center hole 191 serving as a through hole is provided in the rotation center of the rotating section 190. The rotating section 190 is rotatably supported by the driving mechanism 174 described later.

The sealing member 192 is a member for closing a space between the rotating section 190 and the bottom surface 182 and is provided along the entire peripheral edge of the rotating section 190. Thus, when the raw material MA is fed into the case 170, the raw material MA is inhibited from entering the space between the rotating section 190 and the bottom surface 182. Therefore, the raw material MA is inhibited from being compressed between the rotating section 190 and the bottom surface 182 and from forming lumps. In the present embodiment, the sealing member 192 is formed of a resin such as polyacetal.

The plurality of blades 196 are members that stir the raw material MA in accordance with the rotation of the rotator 172, and, on the upper surface of the rotating section 190, the blades 196 are all disposed in imaginary lines extending radially from the rotation center of the rotating section 190. In the present embodiment, the rotator 172 includes four blades 196 spaced apart at a predetermined interval in the circumferential direction of the rotating section 190. A flange 200 substantially orthogonal to the blade 196 is formed in the lower edge of each of the blades 196. Each of the blades 196 is fixed by the flange 200 being in surface contact with the upper surface of the rotating section 190 and being screwed thereto by a screw member.

Each of the blades 196 is formed such that the height thereof is less than the diameters of the communication port 189A and the communication port 1898. Thus, inside the case 170, a sufficient space is provided above the rotator 172, and the raw material MA is sufficiently stirred by the rotation of the rotator 172. In the present embodiment, the blades 196 stand substantially vertically, but there is no limitation thereto, and an angle formed of the blade 196 and the upper surface of the rotating section 190 is not limited to being a right angle and may be an acute angle or an obtuse angle.

An end of each of the blades 196 located on the center side of the rotator 172 is disposed at a position close to a coupling member 194, and an end of each of the blades 196 located on the outer circumferential side of the rotator 172 is disposed at the peripheral edge of the rotating section 190. That is, the longitudinal direction of each of the blades 196 extends from the vicinity of the rotation center of the rotating section 190 to the peripheral edge. As a result, upon rotation of the rotator 172, the raw material MA fed into the case 170 is able to be stirred over a wider range in the radial direction of the case 170.

As illustrated in FIG. 5, a protruding piece 204 that protrudes outward in the radial direction of the rotating section 190 is provided in the outer peripheral edge of the blade 196. The protruding piece 204 is provided above the outer peripheral edge of the blade 196, and at least a portion of the protruding piece 204 is located at a position overlapping the communication port 189A and the communication port 189B in the height direction of the case 170 in side view of the case 170. Thus, by stirring the raw material MA, the blade 196 is able to push the raw material MA into the communication port 189A and the communication port 189B and is able to more efficiently feed the raw material MA from the communication port 189A and the communication port 189B to the discharging pipe 132.

Note that, in the present embodiment, the rotator 172 rotates counterclockwise when viewed from vertically above.

As illustrated in FIGS. 3 and 4, the protruding member 198 is a member disposed in the rotation center of the upper surface of the rotating section 190, and the protruding member 198 of the present embodiment has a semi-ellipsoidal shape. The protruding member 198 covers the coupling member 194 and is coupled to the end of each of the blades 196 located on the center side of the rotator 172 without a gap therebetween. The height of the protruding member 198 is higher than the height of each of the blades 196 and is about half the height of the side wall 180 in the present embodiment.

The driving mechanism 174 is a member for rotationally driving the rotator 172 and is disposed below the mounting table 136. The driving mechanism 174 includes a stirring motor 210, a housing member 214, a driving shaft 216, and the coupling member 194. The housing member 214 is a cylindrical housing that accommodates the driving shaft 216, and one end of the housing member 214 is coupled to the lower surface of the mounting table 136 so as to cover the bottom-surface hole 183.

The driving shaft 216 is a rod-shaped member accommodated inside the housing member 214, and one end of the driving shaft 216 in the longitudinal direction is inserted into the bottom-surface hole 183 and is coupled to the lower surface of the rotating section 190. A recessed section 218 that is recessed toward the other end is provided in one end of the driving shaft 216 in the longitudinal direction. The recessed section 218 is formed to have substantially the same diameter as the center hole 191. The driving shaft 216 is supported by the housing member 214 via two bearings 220. The other end of the driving shaft 216 in the longitudinal direction protrudes from the housing member 214 and is coupled to the stirring motor 210 via a coupling member 222. The stirring motor 210 is fixed to the mounting table 136 via a fixing member 224.

The coupling member 194 is a member that couples the driving mechanism 174 to the rotating section 190, and an insertion section 195 that protrudes downward is provided on the lower surface of the coupling member 194. The coupling member 194 is disposed on the upper surface of the rotating section 190 so as to cover the center hole 191, and the insertion section 195 is inserted into the center hole 191 and the recessed section 218. The coupling member 194 is fixed to the rotating section 190 and the driving shaft 216 by a plurality of screw members.

Next, the first discharging section 13A and the second discharging section 13B will be described.

As illustrated in FIGS. 1 to 6, the first discharging section 13A includes the discharging pipe 132A, which is the first tubular body, the measuring section 134A, and a transport motor 150A. The second discharging section 13B includes the discharging pipe 132B, which is the second tubular body, the measuring section 134B, and a transport motor 150B.

The discharging pipe 132A is coupled to the communication port 189A of the side wall 180 so as to communicate with the storage space S1 and rotates about a first axis O1 that intersects a rotational axis O. Upon rotation of the discharging pipe 132A, the raw material MA in the storage space S1 is able to be discharged to the defibrating section 20, which is a processing section, via the discharging pipe 132A.

The discharging pipe 132B is coupled to the communication port 189B of the side wall 180 so as to communicate with the storage space S1 and rotates about a second axis O2 that intersects the rotational axis O. Upon rotation of the discharging pipe 132B, the raw material MA in the storage space S1 is able to be discharged to the defibrating section 20 via the discharging pipe 132B.

The discharging pipe 132A and the discharging pipe 132B are provided at the same height from the mounting table 136. That is, the discharging pipe 132A and the discharging pipe 132B are disposed side by side at the same height. Moreover, the discharging pipe 132A and the discharging pipe 132B are disposed side by side in this order in the rotational direction of the blade 196. That is, the discharging pipe 132A is located upstream of the discharging pipe 132B in the rotational direction of the blade 196. Moreover, in the present embodiment, the discharging pipe 132A and the discharging pipe 132B have the same inner diameter. Moreover, in the present embodiment, the rotational directions of the discharging pipe 132A and the discharging pipe 132B are opposite to each other.

Note that, since the first discharging section 13A and the second discharging section 13B are almost similar in configuration except for a difference in an installation position, mainly the first discharging section 13A will be described below.

The discharging pipe 132A is a tubular member that feeds the raw material MA stored in the stirring device 130 to the measuring section 134A. The discharging pipe 132A has a predetermined dimension and has a tubular shape open at both ends, with one end of the discharging pipe 132A rotatably coupled to the stirring device 130, and the other end disposed close to the measuring section 134A. In the present embodiment, the other end is disposed below the upper surface of the mounting table 136. That is, the discharging pipe 132A is provided to be inclined downward in the longitudinal direction in side view.

A threaded section 140 is provided on the inner surface of the discharging pipe 132A. The threaded section 140 stands at a predetermined height toward the central axis of the discharging pipe 132A in the longitudinal direction, that is, the first axis O1. A driven gear 142 is provided across the whole outer surface of the discharging pipe 132A in the circumferential direction.

The transport motor 150A is provided at a position adjacent to the discharging pipe 132A. The transport motor 150A is attached to the upper surface of a support member 135 provided on the side surface of the mounting table 136. The transport motor 150A is provided with a disk-shaped driving gear 152. The driving gear 152 engages the driven gear 142. Thereby, when the transport motor 150A is driven, the discharging pipe 132A is driven to rotate about the first axis O1.

The measuring section 134A is located below the other end of the discharging pipe 132A, is supported by a support table 138, and stores the raw material MA discharged from the other end of the discharging pipe 132A until a predetermined amount is reached. The measuring section 134A includes a receiving section 160, a closing member 162, and a load cell 164.

The receiving section 160 is a box-shaped member having capacity capable of storing a predetermined amount of the raw material MA therein, and an upper-surface opening section 166 is provided on the upper surface of the receiving section 160. The other end of the discharging pipe 132A is disposed above the upper-surface opening section 166. A lower-surface opening section 168 is provided on the lower surface of the receiving section 160.

A fixing section 169 is provided on the outer surface of the receiving section 160. The fixing section 169 protrudes outward from a predetermined portion on the outer surface of the receiving section 160. The fixing section 169 is fixed to the load cell 164 while the lower surface of the fixing section 169 is in contact with the upper surface of the load cell 164. That is, the receiving section 160 is supported by the load cell 164.

The closing member 162 is a plate member that closes the lower-surface opening section 168. The closing member 162 is pivotally fixed to the receiving section 160 and is pivotable between a closed position at which the lower-surface opening section 168 is closed and an open position at which the lower-surface opening section 168 is open. The closing member 162 includes an opening/closing motor (not illustrated) driven by the control device 110 and is pivoted when the opening/closing motor is driven. Specifically, the closing member 162 is disposed normally at the closed position and moves to the open position when the opening/closing motor is driven. Note that the closing member 162 may be provided to be movable between the closed position and the open position by sliding like a shutter.

The load cell 164 is a sensor that detects a force such as weight or torque and outputs a predetermined signal in accordance with the detected force. The load cell 164 is mounted and fixed onto the support table 138, and the fixing section 169 is fixed to the upper surface of the load cell 164 as described above.

In the present embodiment, the load cell 164 measures the weight of the receiving section 160 and outputs a predetermined signal to the control device 110 when the receiving section 160 reaches a specified weight. Accordingly, the control device 110 drives the opening/closing motor, and the closing member 162 moves from the closed position to the open position. Note that the measuring section 134A is not limited to including the load cell 164, and another detector capable of detecting the weight may be used.

In the related art, a discharge port is provided in a bottom portion, that is, a portion corresponding to the mounting table 136. Thus, when pieces of a paper material are entangled and aggregate, the discharge port may be blocked depending on a size of the aggregated paper pieces, and it becomes difficult for the paper material to be smoothly fed. As a result, it may be difficult for the raw material MA to be fed to the defibrating section by a predetermined amount. That is, quantitativity may be deteriorated.

Increasing the amount of the raw material MA stored in the storage section and increasing the amount of the raw material MA discharged from the storage section are required for enhancing productivity. Since a single discharge port is provided in the related art, increasing an opening size of the discharge port is required for increasing the discharge amount. In such an instance, for example, when pieces of a paper material are entangled and aggregate, the aggregated paper pieces are collectively discharged, and quantitativity may be deteriorated.

On the other hand, in the disclosure, the raw-material feeding device 1 includes, in the side wall 180, two discharging sections, which correspond to the first discharging section 13A and the second discharging section 13B. By providing the first discharging section 13A and the second discharging section 13B in the side wall 180, the blade 196, which is rotating, is able to push the raw material MA into the communication port 189A and the communication port 189B, that is, outward in the rotational direction. Thus, it is possible to more efficiently discharge the raw material MA from the communication port 189A and the communication port 189B. Even when pieces of the raw material MA aggregate, the aggregated pieces of the raw material MA are able to be crushed into small pieces and loosened by the blade 196 pushing aggregated pieces of the raw material MA in the radial direction of the blade 196. As a result, it is possible to enhance quantitativity.

Further, since the raw material MA is able to be distributed and discharged to the first discharging section 13A and the second discharging section 13B, it is possible to ensure a sufficient discharge amount without an excessive increase in diameter of the first discharging section 13A and the second discharging section 13B. Thus, even when pieces of the raw material MA aggregate, it is possible to prevent or suppress aggregated pieces of the raw material MA from being correctively discharged. As a result, it is possible to enhance quantitativity. In combination with the effect achieved by providing the first discharging section 13A and the second discharging section 13B in the side wall 180, it is possible to achieve sufficient quantitativity.

In this manner, the raw-material feeding device 1 includes: the storage section 130A that includes the mounting table 136, which is the bottom section, and the side wall 180 standing from the mounting table 136 and that stores, in the storage space S1 surrounded by the mounting table 136 and the side wall 180, small pieces of the raw material MA constituted by a material containing fibers; the stirring section 130B that is provided in the mounting table 136 at a position facing the storage space S1, that includes the blade 196 which rotates about the rotational axis O extending in a direction in which the side wall 180 stands, and that stirs the raw material MA in the storage space S1 by rotating the blade 196; the first discharging section 13A that is provided in the side wall 180 so as to communicate with the storage space S1, that includes the discharging pipe 132A, which is the first tubular body, rotating about the first axis O1 intersecting the rotational axis O, and that, upon rotation of the discharging pipe 132A, discharges, via the discharging pipe 132A, the raw material MA in the storage space S1 to the defibrating section 20, which is the processing section that processes the raw material MA; and the second discharging section 13B that is provided in the side wall 180 at a position different from a position at which the discharging pipe 132A is provided so as to communicate with the storage space S1, that includes the discharging pipe 132B, which is the second tubular body, rotating about the second axis O2 intersecting the rotational axis O, and that, upon rotation of the discharging pipe 132B, discharges, via the discharging pipe 132B, the raw material MA in the storage space S1 to the defibrating section 20. Since the first discharging section 13A and the second discharging section 13B are provided in the side wall 180, the stirring section 130B is able to push the raw material MA outward in the rotational direction. Further, since the raw material MA is able to be distributed and discharged to the first discharging section 13A and the second discharging section 13B, it is possible to ensure a sufficient discharge amount without an excessive increase in diameter of the first discharging section 13A and the second discharging section 13B. Thus, even when pieces of the raw material MA aggregate, it is possible to prevent or suppress aggregated pieces of the raw material MA from being correctively discharged. As a result, it is possible to enhance quantitativity.

Moreover, the sheet manufacturing apparatus 100 includes the raw-material feeding device 1 and the defibrating section 20 which is the processing section that processes the raw material MA fed by the raw-material feeding device 1. As a result, the raw-material feeding device 1 is able to feed the raw material MA with excellent quantitativity and provide a high-quality sheet S.

Moreover, as described above, the discharging pipe 132A, which is the first tubular body, and the discharging pipe 132B, which is the second tubular body, are provided at the same height from the mounting table 136, which is the bottom section. Thus, regardless of the amount of the raw material MA in the storage section 130A, the amount of the raw material MA flowing into the discharging pipe 132A from the storage section 130A and the amount of the raw material MA flowing into the discharging pipe 132B from the storage section 130A are able to be set as equal as possible.

Moreover, as described above, the discharging pipe 132A, which is the first tubular body, and the discharging pipe 132B, which is the second tubular body, are disposed side by side in the rotational direction of the blade 196 in order of the discharging pipe 132A and the discharging pipe 132B. Thus, the raw material MA in the storage section 130A is able to be readily discharged to the discharging pipe 132A and the discharging pipe 132B as uniformly as possible. Further, it is possible to reduce the size of the entire device.

Moreover, as illustrated in FIG. 6, the discharging pipe 132A and the discharging pipe 132B are disposed in a direction intersecting the circumferential direction of the side wall 180. In other words, the discharging pipe 132A and the discharging pipe 132B are disposed such that neither the first axis O1 nor the second axis O2 intersects the rotational axis O. In addition, the discharging pipe 132A and the discharging pipe 132B are disposed such that the rotational axis O is positioned between the first axis O1 and the second axis O2. According to such a configuration, the raw material MA in the storage section 130A is able to be readily discharged to the discharging pipe 132A and the discharging pipe 132B as uniformly as possible.

Moreover, in the present embodiment, the discharging pipe 132A and the discharging pipe 132B are disposed such that the first axis O1 and the second axis O2 intersect a direction tangential to the side wall 180 when viewed from above. According to such a configuration, the raw material MA readily comes into contact with the front side in the rotational direction of the blade 196, that is, the right side viewed from above, in the inner circumferential portion of each of the discharging pipe 132A and the discharging pipe 132B. Rotating the discharging pipe 132A and the discharging pipe 132B enables the raw material MA to be efficiently discharged.

When the configuration is such that the discharging pipe 132A and the discharging pipe 132B are disposed side by side in this order in the rotational direction of the blade 196, the amount of the raw material MA flowing into the discharging pipe 132A positioned upstream in the rotational direction tends to be larger than the amount of the raw material MA flowing into the discharging pipe 132B positioned downstream in the rotational direction. When a difference between the amount of the raw material MA flowing into the discharging pipe 132A and the amount of the raw material MA flowing into the discharging pipe 132B is too large, unevenness occurs in the amounts of the raw material MA discharged from the discharging pipe 132A and the discharging pipe 132B, and quantitativity may be deteriorated. Thus, by providing the following configuration, it is possible to ensure notably higher quantitativity by reducing the difference between the flowing amounts.

As illustrated in FIG. 6, a blocking plate 31, which is a first adjusting member, is provided in an inner circumferential portion of the side wall 180. The blocking plate 31 is disposed to overlap a portion of the first communication port 189A when viewed in the first axis O1 direction. Thus, the blocking plate 31 is able to reduce the amount of the raw material MA flowing into the discharging pipe 132A by reducing an opening degree of the first communication port 189A. Thus, it is possible to achieve notably higher quantitativity by reducing the difference between the amount of the raw material MA flowing into the discharging pipe 132A and the amount of the raw material MA flowing into the discharging pipe 132B.

Moreover, by adjusting the size of the blocking plate 31, an extent to which the blocking plate 31 overlaps the first communication port 189A when viewed in the first axis O1 direction is able to be adjusted.

The blocking plate 31 is disposed such that a line normal to a main surface, which corresponds to a surface in contact with the raw material MA, extends in the first axis O1 direction. In other words, the blocking plate 31 is disposed such that the main surface extends in a direction intersecting the direction tangential to the side wall 180 when viewed from above. Thereby, it is possible to efficiently reduce the amount of the raw material MA flowing into the discharging pipe 132A.

As described above, the raw-material feeding device 1 includes the blocking plate 31, which is the first adjusting member, for reducing the amount of the raw material MA flowing into the first communication port 189A of the discharging pipe 132A which is the first tubular body. The first communication port 189A communicates with the storage space S1. This makes it possible to reduce the amount of the raw material MA flowing into the discharging pipe 132A. Thus, it is possible to achieve notably higher quantitativity by reducing the difference between the amount of the raw material MA flowing into the discharging pipe 132A and the amount of the raw material MA flowing into the discharging pipe 132B.

Moreover, as illustrated in FIG. 6, a capturing plate 32, which is a second adjusting member, is provided in an inner circumferential portion of the side wall 180. The capturing plate 32 is positioned downstream of the second communication port 189B in the rotational direction of the blade 196. The capturing plate 32 is disposed so as not to overlap the second communication port 189B when viewed in the first axis O1 direction. The capturing plate 32 is disposed such that the main surface thereof intersects the direction tangential to the side wall 180 when viewed from above.

The capturing plate 32 has a function of capturing a portion of the raw material MA which is moved by the blade 196 and which passes the second communication port 189B without flowing into the second communication port 189B to guide the captured raw material MA to the second communication port 189B. Thereby, it is possible to increase the amount of the raw material MA flowing into the discharging pipe 132B. Thus, it is possible to achieve notably higher quantitativity by reducing the difference between the amount of the raw material MA flowing into the discharging pipe 132A and the amount of the raw material MA flowing into the discharging pipe 132B.

As described above, the raw-material feeding device 1 includes the capturing plate 32, which is the second adjusting member, for increasing the amount of the raw material MA flowing into the second communication port 189B of the discharging pipe 132B, which is the second tubular body. The second communication port 189B communicates with the storage space S1. Thereby, it is possible to increase the amount of the raw material MA flowing into the discharging pipe 132B. Thus, it is possible to achieve notably higher quantitativity by reducing the difference between the amount of the raw material MA flowing into the discharging pipe 132A and the amount of the raw material MA flowing into the discharging pipe 132B.

Note that the first adjusting member and the second adjusting member are not limited to being a plate member as illustrated in the drawing and may be, for example, a mesh-shaped or rod-shaped member.

Second Embodiment

Figure 7:
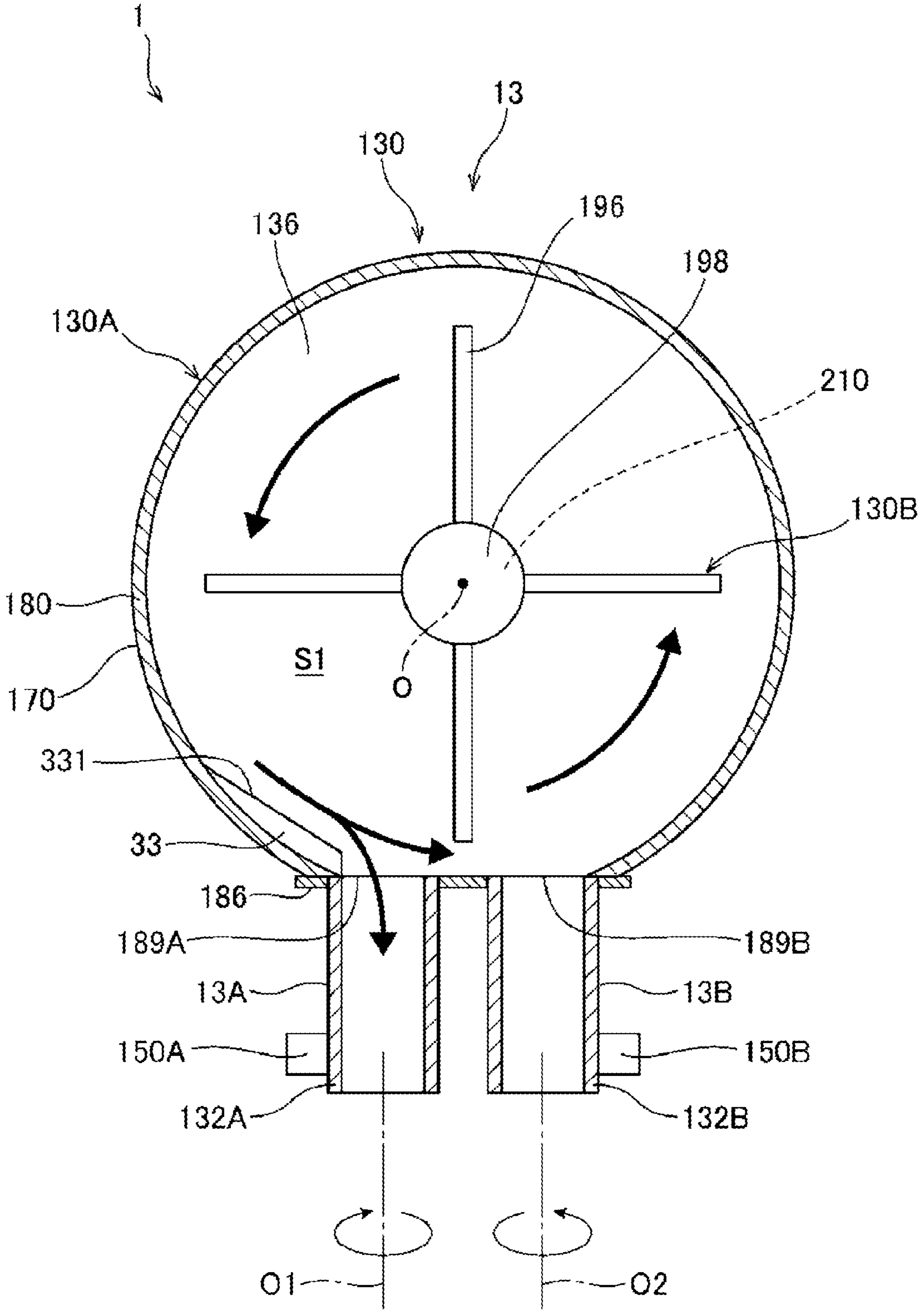
FIG. 7 is a transverse sectional view schematically illustrating a raw-material feeding device according to a second embodiment of the disclosure.

FIG. 7 is a transverse sectional view schematically illustrating a raw-material feeding device according to a second embodiment of the disclosure.

Although the raw-material feeding device according to the second embodiment of the disclosure will be described below with reference to the drawing, mainly a difference from the aforementioned embodiment will be described, and description for similar matters will be omitted.

As illustrated in FIG. 7, the raw-material feeding device 1 of the present embodiment includes, in an inner circumferential portion of the side wall 180, a rectifying section 33 that is provided to protrude inward. The rectifying section 33 is a member having a guiding surface 331. The rectifying section 33 is provided upstream of the communication port 189A in the rotational direction of the blade 196 in the inner circumferential portion of the side wall 180.

The guiding surface 331 is provided to be inclined relative to a line tangential to the inner circumferential surface of the side wall 180 and has a function of causing a movement direction of the raw material MA stirred in the storage section 130A to divert from a direction toward the communication port 189A. Thereby, it is possible to reduce the amount of the raw material MA flowing into the discharging pipe 132A. Thus, it is possible to achieve notably higher quantitativity by reducing the difference between the amount of the raw material MA flowing into the discharging pipe 132A and the amount of the raw material MA flowing into the discharging pipe 132B.

Third Embodiment

Figure 8:
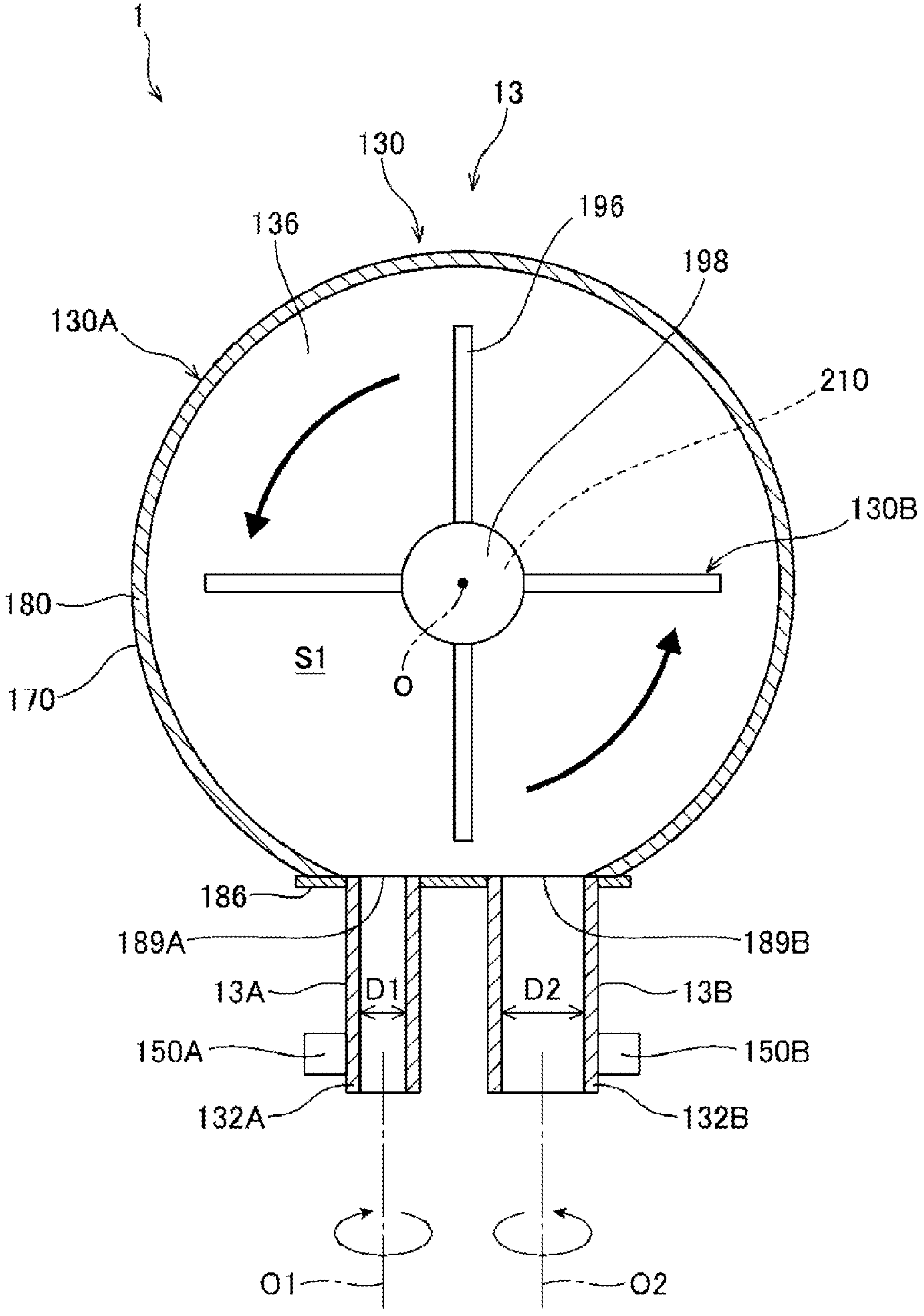
FIG. 8 is a transverse sectional view schematically illustrating a raw-material feeding device according to a third embodiment of the disclosure.

FIG. 8 is a transverse sectional view schematically illustrating a raw-material feeding device according to a third embodiment of the disclosure.

Although the raw-material feeding device according to the third embodiment of the disclosure will be described below with reference to the drawing, mainly a difference from the aforementioned embodiment will be described, and description for similar matters will be omitted.

As illustrated in FIG. 8, in the raw-material feeding device 1 of the present embodiment, an inner diameter D1 of the discharging pipe 132A is smaller than an inner diameter D2 of the discharging pipe 132B. That is, the opening size of the communication port 189A is smaller than the opening size of the communication port 189B. According to such a configuration, it is possible to reduce the amount of the raw material MA flowing into the discharging pipe 132A. Thus, it is possible to achieve notably higher quantitativity by reducing the difference between the amount of the raw material MA flowing into the discharging pipe 132A and the amount of the raw material MA flowing into the discharging pipe 132B.

As described above, the communication port 189A, which is a first communication port, for communicating with the storage space S1 of the discharging pipe 132A, which is the first tubular body, is smaller than the communication port 189B, which is a second communication port, for communicating with the storage space S1 of the discharging pipe 132B, which is the second tubular body. Thereby, it is possible to reduce the amount of the raw material MA flowing into the discharging pipe 132A. Thus, it is possible to achieve notably higher quantitativity by reducing the difference between the amount of the raw material MA flowing into the discharging pipe 132A and the amount of the raw material MA flowing into the discharging pipe 132B.

Fourth Embodiment

Figure 9:
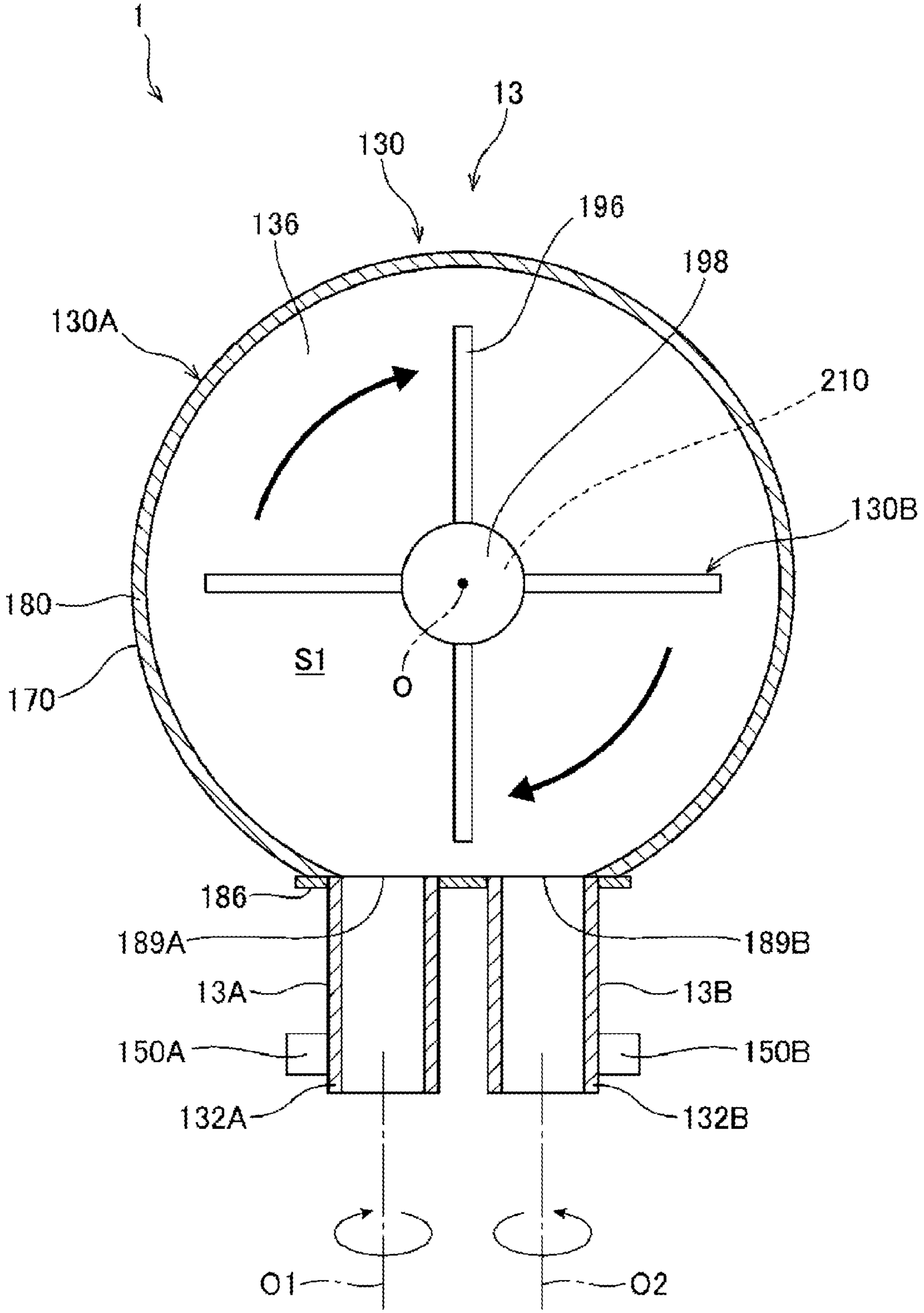
FIG. 9 is a transverse sectional view schematically illustrating a raw-material feeding device according to a fourth embodiment of the disclosure.

FIG. 9 is a transverse sectional view schematically illustrating a raw-material feeding device according to a fourth embodiment of the disclosure.

Although the raw-material feeding device according to the fourth embodiment of the disclosure will be described below with reference to the drawing, mainly a difference from the aforementioned embodiment will be described, and description for similar matters will be omitted.

In the present embodiment, the control device 110, which is a control section, controls the operation of the driving mechanism 174 such that the blade 196 switches between a first state in which the blade 196 rotates counterclockwise as illustrated in FIG. 6 and a second state in which the blade 196 rotates clockwise as illustrated in FIG. 9 when viewed from above. Such switching may be configured to be performed per predetermined time or in accordance with detection results from the measuring section 134A and the measuring section 134B.

In the first state, the amount of the raw material MA flowing into the discharging pipe 132A positioned upstream in the rotational direction is larger than the amount of the raw material MA flowing into the discharging pipe 132B. In the second state, the amount of the raw material MA flowing into the discharging pipe 132B positioned upstream in the rotational direction is larger than the amount of the raw material MA flowing into the discharging pipe 132A. By alternately switching the first state and the second state as described above, the amount of the raw material MA flowing into the discharging pipe 132A and the amount of the raw material MA flowing into the discharging pipe 132B are able to be set as evenly as possible as a whole. As a result, it is possible to achieve notably higher quantitativity.

Moreover, in the present embodiment, the control device 100, which is the control section, controls the operation of the stirring section 130B so as to switch the rotational direction of the blade 196 per predetermined time. Thereby, the amount of the raw material MA flowing into the discharging pipe 132A and the amount of the raw material MA flowing into the discharging pipe 132B are able to be set as evenly as possible as a whole. As a result, it is possible to achieve notably higher quantitativity.

Fifth Embodiment

Figure 10:
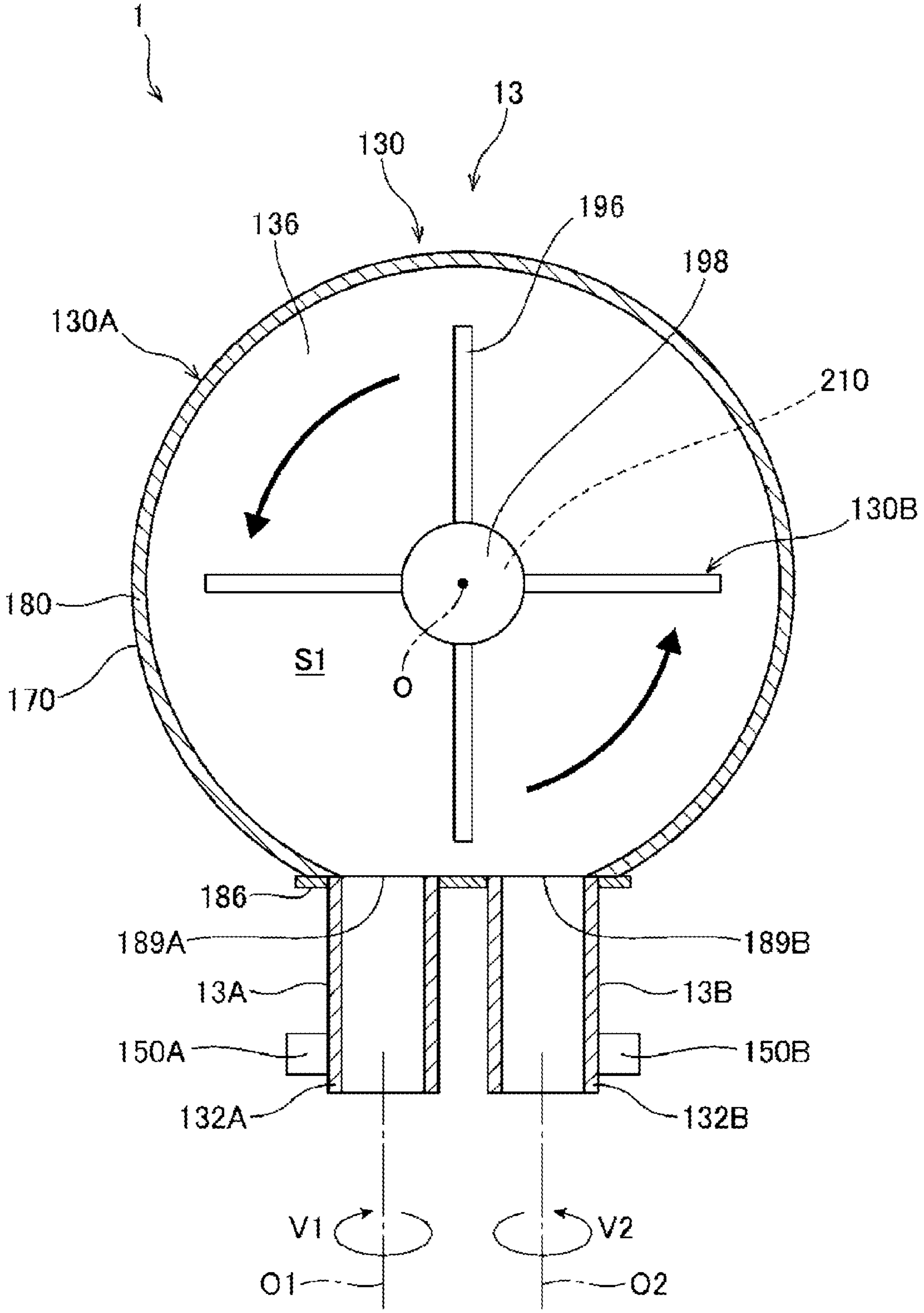
FIG. 10 is a transverse sectional view schematically illustrating a raw-material feeding device according to a fifth embodiment of the disclosure.

FIG. 10 is a transverse sectional view schematically illustrating a raw-material feeding device according to a fifth embodiment of the disclosure.

Although the raw-material feeding device according to the fifth embodiment of the disclosure will be described below with reference to the drawing, mainly a difference from the aforementioned embodiment will be described, and description for similar matters will be omitted.

In the present embodiment, as illustrated in FIG. 10, the control device 110, which is the control section, controls driving of the transport motor 150A and the transport motor 150B such that rotational velocity V1 of the discharging pipe 132A and rotational velocity V2 of the discharging pipe 132B differ from each other. Specifically, the control device 110 controls driving of the transport motor 150A and the transport motor 150B such that the rotational velocity V1 of the discharging pipe 132A is lower than the rotational velocity V2 of the discharging pipe 132B. Thereby, it is possible to reduce the amount of the raw material MA transported by the discharging pipe 132A per unit time, that is, the amount thereof discharged by the discharging pipe 132A per unit time, to less than the amount of the raw material MA discharged by the discharge pipe 132B per unit time. Thus, the amount of the raw material MA discharged by the discharging pipe 132A per unit time and the amount of the raw material MA discharged by the discharging pipe 132B per unit time are able to be set as evenly as possible. As a result, it is possible to achieve notably higher quantitativity.

As described above, the raw-material feeding device 1 includes the transport motor 150A and the transport motor 150B that are rotational driving sections that rotationally drive the discharging pipe 132A and the discharging pipe 132B, respectively, and the control device 110, which is the control section, for controlling operation of the transport motor 150A and the transport motor 150B. Thereby, it is possible to adjust the rotational velocity as described above.

Moreover, the control device 110, which is the control section, controls operation of the transport motor 150A and the transport motor 150B such that the rotational velocity of the discharging pipe 132B, which is the second tubular body, is higher than that of the discharging pipe 132A, which is the first tubular body. Thereby, even when the amount of the raw material MA flowing into the discharging pipe 132A differs from the amount of the raw material MA flowing into the discharging pipe 132B, it is possible to cancel out the difference by adjusting the transport velocity. As a result, it is possible to achieve notably higher quantitativity.

Sixth Embodiment

Figure 11:
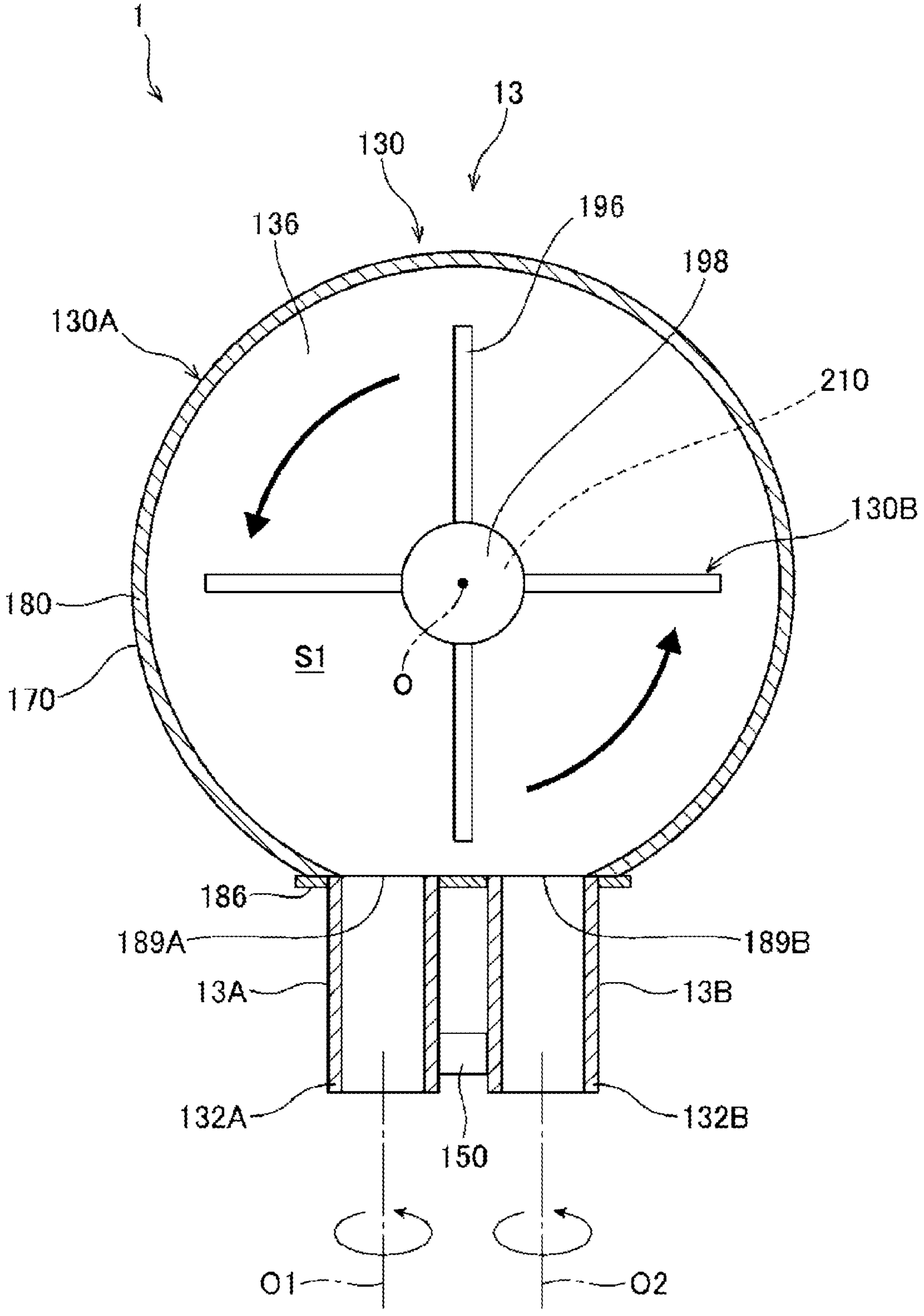
FIG. 11 is a transverse sectional view schematically illustrating a raw-material feeding device according to a sixth embodiment of the disclosure.
Figure 12:
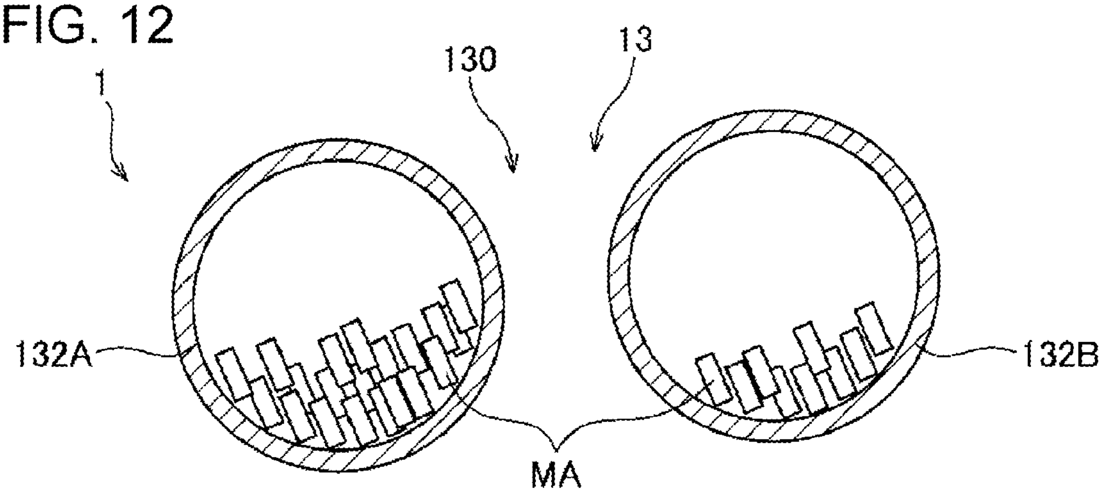
FIG. 12 is a transverse sectional view for explaining a state in which a first tubular body and a second tubular body of the raw-material feeding device according to the sixth embodiment of the disclosure rotate to transport raw material.
Figure 13:
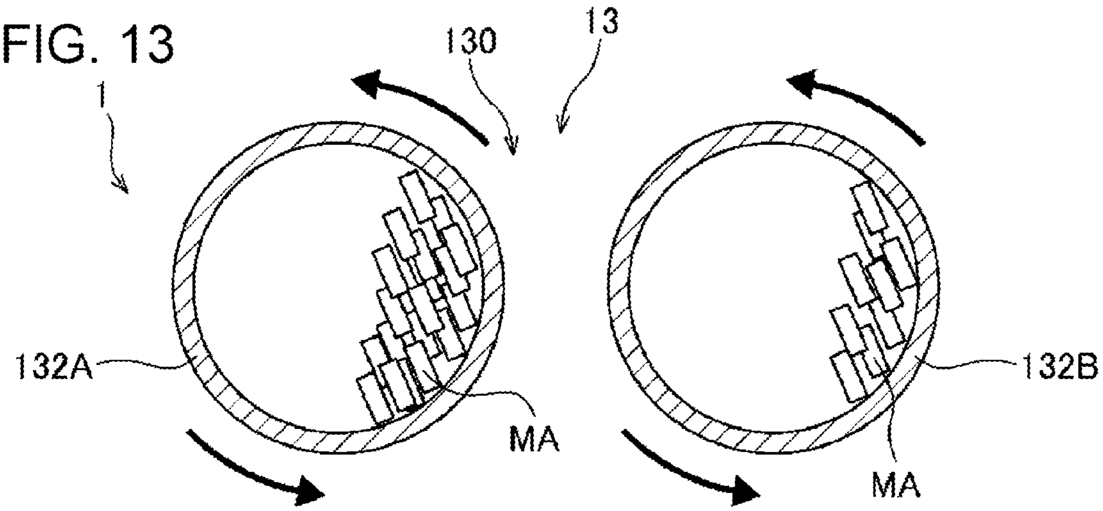
FIG. 13 is a transverse sectional view for explaining a state in which the first tubular body and the second tubular body of the raw-material feeding device according to the sixth embodiment of the disclosure rotate to transport the raw material.
Figure 14:
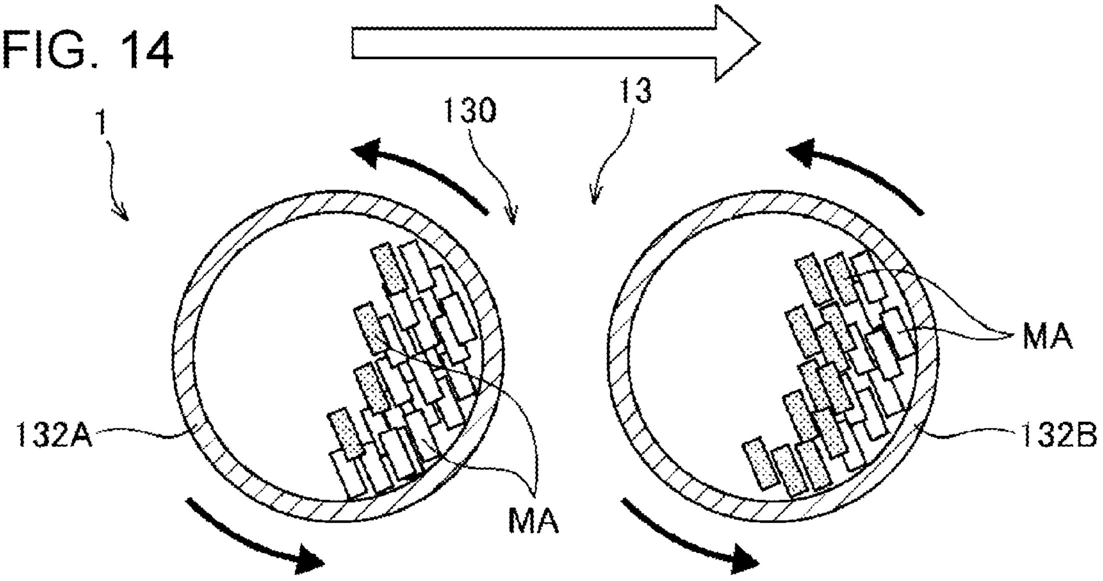
FIG. 14 is a transverse sectional view for explaining a state in which the first tubular body and the second tubular body of the raw-material feeding device according to the sixth embodiment of the disclosure rotate to transport the raw material.

FIG. 11 is a transverse sectional view schematically illustrating a raw-material feeding device according to a sixth embodiment of the disclosure. FIGS. 12 to 14 are transverse sectional views for explaining a state in which a first tubular body and a second tubular body of the raw-material feeding device according to the sixth embodiment of the disclosure rotate to transport the raw material.

Although the raw-material feeding device according to the sixth embodiment of the disclosure will be described below with reference to the drawings, mainly a difference from the aforementioned embodiment will be described, and description for similar matters will be omitted.

As illustrated in FIG. 11, in the present embodiment, a single transport motor 150 drives both the discharging pipe 132A and the discharging pipe 132B. That is, in the present embodiment, the discharging pipe 132A and the discharging pipe 132B share the single transport motor 150. The transport motor 150 is provided between the discharging pipe 132A and the discharging pipe 132B. According to such a configuration, it is possible to reduce the number of transport motors and simplify the configuration of the device.

According to such a configuration, the discharging pipe 132A and the discharging pipe 132B rotate in the same direction, and the following advantage is able to be obtained.

First, as illustrated in FIG. 12, the raw material MA flows into the discharging pipe 132A so as to be distributed unevenly to the right side, that is, downstream in the rotational direction of the blade 196. This is because the raw material MA flows through the communication port 189A in the direction tangential to the side wall 180 when viewed from above as illustrated in FIG. 6. Moreover, the raw material MA flows into the discharging pipe 132B so as to be distributed unevenly to the lower side. This is because the raw material MA flows through the communication port 189A in the direction tangential to the side wall 180 when viewed from above as illustrated in FIG. 6. At this time, the amount of the raw material MA flowing into the discharging pipe 132A is larger than the amount of the raw material MA flowing to the discharging pipe 132B.

As illustrated in FIG. 13, when the discharging pipe 132A and the discharging pipe 132B rotate in the same direction, the raw material MA in the discharging pipe 132A and the raw material MA in the discharging pipe 132B move in the rotational direction of the discharging pipe 132A and the discharging pipe 132B. At this time, a space is formed in a lower portion, that is, the portion into which the raw material MA flows, in the discharging pipe 132B. Thus, the raw material MA flows into the discharging pipe 132B so as to fill the space. As a result, as illustrated in FIG. 14, the amount of the raw material MA in the discharging pipe 132A is substantially the same as the amount of the raw material MA in the discharging pipe 132B.

As described above, in the present embodiment, since the discharging pipe 132A and the discharging pipe 132B rotate in the same direction, it is possible to reduce the difference between the amount of the raw material MA discharged by the discharging pipe 132A and the amount of the raw material MA discharged by the discharging pipe 132B. As a result, it is possible to achieve high quantitativity with a simple configuration.

Moreover, the raw-material feeding device of the disclosure may be obtained by combining any two or more configurations of the aforementioned embodiments.

Figure 15:
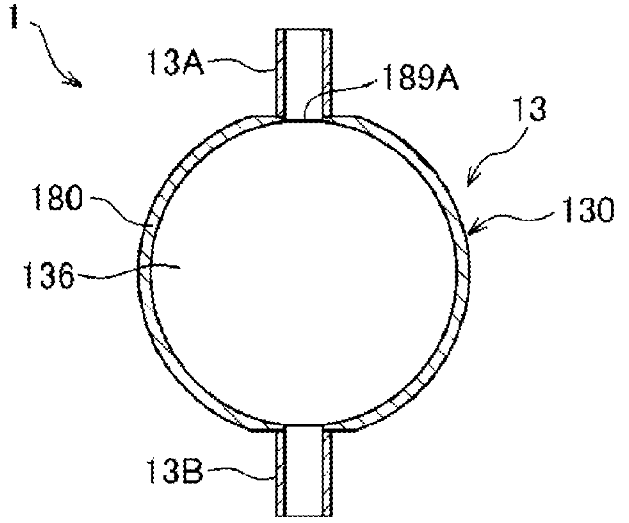
FIG. 15 is a transverse sectional view schematically illustrating a modified example of the raw-material feeding device of the disclosure.
Figure 16:
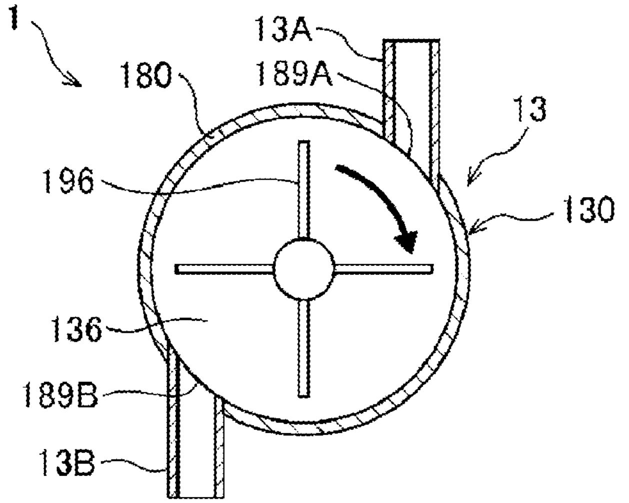
FIG. 16 is a transverse sectional view schematically illustrating a modified example of the raw-material feeding device of the disclosure.
Figure 17:
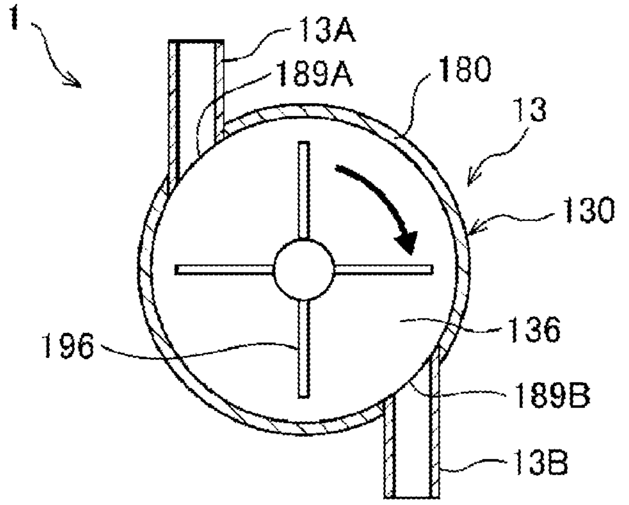
FIG. 17 is a transverse sectional view schematically illustrating a modified example of the raw-material feeding device of the disclosure.

Note that, as illustrated in FIGS. 15 to 17, the configuration may be such that the discharging pipe 132A and the discharging pipe 132B are not disposed side by side in the rotational direction of the blade 196. In FIG. 15, the discharging pipe 132A and the discharging pipe 132B are disposed to be positioned in a straight line passing the rotational axis O. In FIGS. 16 and 17, the discharging pipe 132A and the discharging pipe 132B are disposed in a direction tangential to the side wall 180.

What is claimed is:

1. A raw-material feeding device comprising:

a storage section that includes a bottom section and a side wall standing from the bottom section and that stores, in a storage space surrounded by the bottom section and the side wall, small pieces of raw material constituted by a material containing fibers;

a stirring section that is provided in the bottom section at a position facing the storage space, the stirring section including a rotator, the rotator including a disk-shaped rotating section covering the bottom section of the storage section and configured to rotate about a rotational axis extending in a direction in which the side wall stands, and a blade fixed to the rotating section so as to protrude from the rotating section, and configured to stir the raw material in the storage space by being rotated with the rotating section;

a first discharging section that is provided in the side wall so as to communicate with the storage space, that includes a first tubular body rotating about a first axis not parallel to the rotational axis, and that, upon rotation of the first tubular body, discharges, via the first tubular body, the raw material in the storage space to a processing section that processes the raw material, one end of the first tubular body defining a first communication port that opens at the side wall, the first axis being inclined downwardly so that the one end of the first tubular body defining the first communication port is positioned higher than an opposite end of the first tubular body; and a second discharging section that is provided in the side wall at a position different from a position at which the first tubular body is provided so as to communicate with the storage space, that includes a second tubular body rotating about a second axis not parallel to the rotational axis, and that, upon rotation of the second tubular body, discharges, via the second tubular body, the raw material in the storage space to the processing section, one end of the second tubular body defining a second communication port that opens at the side wall.

2. The raw-material feeding device according to claim 1, wherein the first tubular body and the second tubular body are provided at a same height from the bottom section.

3. The raw-material feeding device according to claim 1, wherein the first tubular body and the second tubular body are disposed side by side in a rotational direction of the stirring section in order of the first tubular body and the second tubular body.

4. The raw-material feeding device according to claim 3, further comprising a first adjusting member that reduces an amount of the raw material flowing into a first communication port of the first tubular body, the first communication port communicating with the storage space.

5. The raw-material feeding device according to claim 3, further comprising a second adjusting member that increases an amount of the raw material flowing into a second communication port of the second tubular body, the second communication port communicating with the storage space.

6. The raw-material feeding device according to claim 3, wherein the first communication port communicating with the storage space is smaller than the second communication port communicating with the storage space.

7. The raw-material feeding device according to claim 3, further comprising:

a rotational driving section that rotationally drives the first tubular body and the second tubular body; and a control section that controls operation of the rotational driving section.

8. The raw-material feeding device according to claim 7, wherein the control section controls the operation of the rotational driving section such that rotational velocity of the second tubular body is higher than rotational velocity of the first tubular body.

9. The raw-material feeding device according to claim 7, wherein the control section controls operation of the stirring section so as to selectively switch a rotational direction of the blade.

10. A sheet manufacturing apparatus comprising:

the raw-material feeding device according to claim 1; and a processing section that processes the raw material fed by the raw-material feeding device.

11. The raw-material feeding device according to claim 1, wherein at least a part of the blade is positioned higher than a lowest edge of the first communication port and lower than a highest edge of the first communication port.

12. The raw-material feeding device according to claim 1, wherein the second axis is inclined downwardly so that the one end of the second tubular body defining the second communication port is positioned higher than an opposite end of the second tubular body.

* * * * *